(12) United States Patent  
Mehta et al.

(10) Patent No.: US 8,966,525 B2  
(45) Date of Patent: Feb. 24, 2015

(54) CONTEXTUAL INFORMATION BETWEEN TELEVISION AND USER DEVICE

(75) Inventors: Gaurav D. Mehta, Brookline, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 271 days.

(21) Appl. No.: 13/291,571

(22) Filed: Nov. 8, 2011

(65) Prior Publication Data

US 2013/0117782 A1    May 9, 2013

(51) Int. Cl.
*H04N 21/2668*  (2011.01)
*G06Q 30/02*  (2012.01)
*H04H 60/00*  (2008.01)
*H04N 21/41*  (2011.01)
*H04N 21/439*  (2011.01)
*H04N 21/4402*  (2011.01)
*H04N 21/478*  (2011.01)
*H04N 21/61*  (2011.01)
*H04N 21/81*  (2011.01)

(52) U.S. Cl.
CPC .......... *G06Q 30/0251* (2013.01); *H04H 60/00* (2013.01); *H04N 21/2668* (2013.01); *H04N 21/4126* (2013.01); *H04N 21/4394* (2013.01); *H04N 21/440236* (2013.01); *H04N 21/478* (2013.01); *H04N 21/6181* (2013.01); *H04N 21/812* (2013.01); *H04N 21/8133* (2013.01); *H04N 21/8106* (2013.01)
USPC ......................................................... 725/34

(58) Field of Classification Search
CPC ............ H04N 21/812; H04N 21/4532; H04N 21/2668; H04N 21/4126; H04N 21/4394; H04N 21/440236; H04N 21/478; H04N 21/6181; H04N 21/8133; H04N 21/8106; G06Q 30/0251; H04H 60/00
USPC ....................................................... 725/32–36
See application file for complete search history.

(56) References Cited

U.S. PATENT DOCUMENTS

| | | | | |
|---|---|---|---|---|
| 5,892,536 A * | 4/1999 | Logan et al. | ..................... | 725/34 |
| 5,986,692 A * | 11/1999 | Logan et al. | ..................... | 725/35 |
| 6,574,594 B2 * | 6/2003 | Pitman et al. | ................. | 704/236 |
| 6,593,976 B1 * | 7/2003 | Lord | ............................ | 348/731 |
| 6,741,684 B2 * | 5/2004 | Kaars | ....................... | 379/110.01 |
| 6,748,360 B2 * | 6/2004 | Pitman et al. | ................. | 704/270 |
| 6,968,565 B1 * | 11/2005 | Slaney et al. | .................. | 725/10 |
| 7,031,921 B2 * | 4/2006 | Pitman et al. | ................. | 704/270.1 |
| 7,055,166 B1 * | 5/2006 | Logan et al. | ..................... | 725/32 |
| 7,058,376 B2 * | 6/2006 | Logan et al. | ............... | 455/186.1 |
| 7,085,613 B2 * | 8/2006 | Pitman et al. | .................. | 700/94 |
| 7,124,186 B2 * | 10/2006 | Piccionelli | .................... | 709/225 |
| 7,200,852 B1 * | 4/2007 | Block | ............................ | 725/28 |
| 7,280,133 B2 * | 10/2007 | Lord | .......................... | 348/14.01 |
| 7,359,006 B1 * | 4/2008 | Xiang et al. | ................... | 348/515 |
| 7,526,181 B2 * | 4/2009 | Burges et al. | ................. | 386/344 |

(Continued)

*Primary Examiner* — Nasser Goodarzi
*Assistant Examiner* — Michael B Pierorazio

(57) ABSTRACT

A device receives, from a user device, recorded audio and input information associated with content viewed by a user of the user device, and converts the recorded audio into textual information. The device determines whether the content is an advertisement or television content based on the textual information and the input information, and provides, to the user device, promotional content related to the advertisement when the content is determined to be the advertisement. The device provides, to the user device, promotional content related to the television content when the content is determined to be the television content.

22 Claims, 9 Drawing Sheets

(56) References Cited

U.S. PATENT DOCUMENTS

| | | | |
|---|---|---|---|
| 7,640,560 B2* | 12/2009 | Logan et al. | 725/32 |
| 7,653,921 B2* | 1/2010 | Herley | 725/19 |
| 7,661,116 B2* | 2/2010 | Slaney et al. | 725/22 |
| 7,673,313 B2* | 3/2010 | Masaki | 725/25 |
| 7,694,318 B2* | 4/2010 | Konig et al. | 725/32 |
| 7,707,241 B2* | 4/2010 | Bruekers | 709/203 |
| 7,769,756 B2* | 8/2010 | Krikorian et al. | 707/736 |
| 7,826,708 B2* | 11/2010 | Herley et al. | 386/241 |
| 7,908,555 B2* | 3/2011 | Zellner | 715/718 |
| 7,930,714 B2* | 4/2011 | Konig et al. | 725/32 |
| 2002/0019732 A1* | 2/2002 | Kikinis et al. | 704/201 |
| 2002/0082731 A1* | 6/2002 | Pitman et al. | 700/94 |
| 2002/0082837 A1* | 6/2002 | Pitman et al. | 704/270.1 |
| 2002/0099555 A1* | 7/2002 | Pitman et al. | 704/500 |
| 2002/0107965 A1* | 8/2002 | Piccionelli | 709/225 |
| 2002/0116195 A1* | 8/2002 | Pitman et al. | 704/260 |
| 2002/0164004 A1* | 11/2002 | Tamura et al. | 379/93.12 |
| 2002/0174436 A1* | 11/2002 | Wu et al. | 725/87 |
| 2003/0002638 A1* | 1/2003 | Kaars | 379/110.01 |
| 2003/0103644 A1* | 6/2003 | Klayh | 382/100 |
| 2004/0025176 A1* | 2/2004 | Franklin et al. | 725/22 |
| 2004/0189873 A1* | 9/2004 | Konig et al. | 348/607 |
| 2004/0194130 A1* | 9/2004 | Konig et al. | 725/32 |
| 2004/0237102 A1* | 11/2004 | Konig et al. | 725/36 |
| 2004/0255330 A1* | 12/2004 | Logan | 725/115 |
| 2005/0039206 A1* | 2/2005 | Opdycke | 725/35 |
| 2005/0044561 A1* | 2/2005 | McDonald | 725/18 |
| 2005/0066352 A1* | 3/2005 | Herley | 725/19 |
| 2005/0132420 A1* | 6/2005 | Howard et al. | 725/135 |
| 2006/0072378 A1* | 4/2006 | Bruekers | 369/30.01 |
| 2006/0092281 A1* | 5/2006 | Herley et al. | 348/207.99 |
| 2006/0092282 A1* | 5/2006 | Herley et al. | 348/207.99 |
| 2006/0146787 A1* | 7/2006 | Wijnands et al. | 370/352 |
| 2006/0179453 A1* | 8/2006 | Kadie et al. | 725/34 |
| 2006/0184960 A1* | 8/2006 | Horton et al. | 725/25 |
| 2006/0218579 A1* | 9/2006 | Logan et al. | 725/32 |
| 2006/0218617 A1* | 9/2006 | Bradstreet et al. | 725/135 |
| 2006/0245625 A1* | 11/2006 | Tichelaar et al. | 382/124 |
| 2006/0271968 A1* | 11/2006 | Zellner | 725/81 |
| 2007/0016918 A1* | 1/2007 | Alcorn et al. | 725/22 |
| 2007/0079137 A1* | 4/2007 | Tu | 713/186 |
| 2007/0124756 A1* | 5/2007 | Covell et al. | 725/18 |
| 2007/0234213 A1* | 10/2007 | Krikorian et al. | 715/716 |
| 2007/0250863 A1* | 10/2007 | Ferguson | 725/46 |
| 2007/0277195 A1* | 11/2007 | Nishigaki | 725/34 |
| 2007/0288961 A1* | 12/2007 | Guldi et al. | 725/46 |
| 2008/0066098 A1* | 3/2008 | Witteman et al. | 725/34 |
| 2008/0082510 A1* | 4/2008 | Wang et al. | 707/3 |
| 2008/0089551 A1* | 4/2008 | Heather et al. | 382/100 |
| 2008/0109284 A1* | 5/2008 | Slaney et al. | 705/7 |
| 2008/0291471 A1* | 11/2008 | Uchida | 358/1.6 |
| 2008/0297669 A1* | 12/2008 | Zalewski et al. | 348/844 |
| 2008/0320518 A1* | 12/2008 | Beadle et al. | 725/46 |
| 2008/0320519 A1* | 12/2008 | Beadle et al. | 725/46 |
| 2008/0320520 A1* | 12/2008 | Beadle et al. | 725/46 |
| 2008/0320558 A1* | 12/2008 | Imanishi et al. | 726/2 |
| 2009/0041418 A1* | 2/2009 | Candelore et al. | 386/39 |
| 2009/0059090 A1* | 3/2009 | Fan et al. | 348/734 |
| 2009/0074235 A1* | 3/2009 | Lahr et al. | 382/100 |
| 2009/0077580 A1* | 3/2009 | Konig et al. | 725/34 |
| 2009/0187936 A1* | 7/2009 | Parekh et al. | 725/25 |
| 2009/0210902 A1* | 8/2009 | Slaney et al. | 725/34 |
| 2009/0271255 A1* | 10/2009 | Utter et al. | 705/14 |
| 2009/0288110 A1* | 11/2009 | Logan et al. | 725/24 |
| 2010/0001832 A1* | 1/2010 | Langille | 340/5.83 |
| 2010/0005501 A1* | 1/2010 | Stokking et al. | 725/115 |
| 2010/0030642 A1* | 2/2010 | Huffman et al. | 705/14.49 |
| 2010/0119208 A1* | 5/2010 | Davis et al. | 386/83 |
| 2010/0146445 A1* | 6/2010 | Kraut | 715/821 |
| 2010/0153993 A1* | 6/2010 | Konig et al. | 725/34 |
| 2010/0205628 A1* | 8/2010 | Davis et al. | 725/25 |
| 2010/0228857 A1* | 9/2010 | Petrovic et al. | 709/224 |
| 2010/0269128 A1* | 10/2010 | Gordon | 725/25 |
| 2010/0269138 A1* | 10/2010 | Krikorian et al. | 725/39 |
| 2010/0280641 A1* | 11/2010 | Harkness et al. | 700/94 |
| 2010/0306805 A1* | 12/2010 | Neumeier et al. | 725/60 |
| 2010/0318429 A1* | 12/2010 | Birch | 705/14.66 |
| 2010/0324992 A1* | 12/2010 | Birch | 705/14.49 |
| 2011/0010732 A1* | 1/2011 | Opdycke | 725/10 |
| 2011/0016002 A1* | 1/2011 | Opdycke | 705/14.69 |
| 2011/0016006 A1* | 1/2011 | Opdycke | 705/14.73 |
| 2011/0016011 A1* | 1/2011 | Opdycke | 705/26.1 |
| 2011/0016480 A1* | 1/2011 | Opdycke | 725/10 |
| 2011/0016483 A1* | 1/2011 | Opdycke | 725/14 |
| 2011/0061074 A1* | 3/2011 | Beadle et al. | 725/46 |
| 2011/0063503 A1* | 3/2011 | Brand et al. | 348/500 |
| 2011/0069937 A1* | 3/2011 | Toerner | 386/250 |
| 2011/0078729 A1* | 3/2011 | LaJoie et al. | 725/36 |
| 2011/0087490 A1* | 4/2011 | Olson | 704/231 |
| 2011/0135283 A1* | 6/2011 | Poniatowki et al. | 386/297 |
| 2011/0137976 A1* | 6/2011 | Poniatowski et al. | 709/203 |
| 2011/0153417 A1* | 6/2011 | Bernosky | 705/14.49 |
| 2011/0244784 A1* | 10/2011 | Wang | 455/2.01 |
| 2011/0276157 A1* | 11/2011 | Wang et al. | 700/94 |
| 2012/0167132 A1* | 6/2012 | Mathews et al. | 725/32 |

* cited by examiner

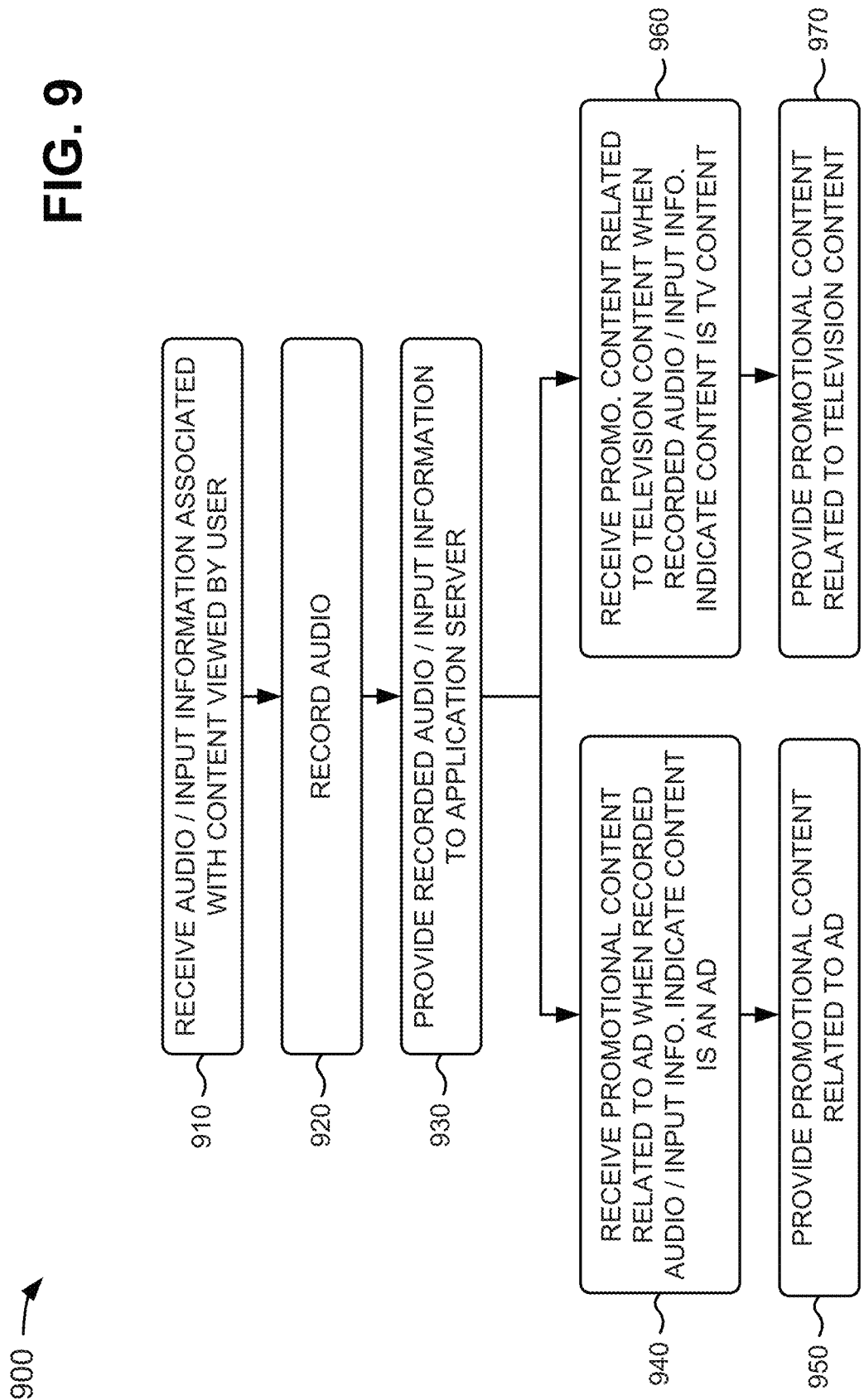

2
CONTEXTUAL INFORMATION BETWEEN TELEVISION AND USER DEVICE

BACKGROUND

Many television users (or viewers) regularly watch a number of television (TV) channels that display television content (e.g., TV shows, pay-per-view (PPV) content, video-on-demand (VOD) content, sporting events, etc.). One or more commercials or advertisements may be displayed to the user during the airing of the television content. More and more viewers watching television content or advertisements are browsing contextual information (e.g., web sites, advertisements, etc.) related to the television content and/or advertisements, via mobile user devices, such as smart phones, tablet computers, etc.

BRIEF DESCRIPTION OF THE DRAWINGS

FIG. 9 is a flow chart of another example process for providing contextual information between a television and a user device according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a user device to obtain contextual information (e.g., advertisements, coupons, web sites, etc.) related to television content and/or advertisements currently being viewed by a user of the user device. In one example, the user may be watching a television show while holding a mobile user device (e.g., a smart phone, a tablet computer, etc.). The user may use the mobile user device to browse information related to the television show, such as a web page dedicated to the television show. The mobile user device may record audio associated with the television show, and may utilize the recorded audio and/or user inputs (e.g., keywords associated with television show) to identify the television show and automatically receive contextual information related to the television show. The contextual information may be displayed by the mobile user device and may include promotional advertisements, digital content, physical media, coupons, polls, quizzes, etc. associated with the television show. Such an arrangement may create a linkage between television content and/or advertisements displayed on a television and a mobile user device. The mobile user device may enable a user to more quickly and easily act on television content and/or advertisements.

As used herein, the terms "customer," "viewer," and/or "user" may be used interchangeably. Also, the terms "customer," "viewer," and/or "user" are intended to be broadly interpreted to include a set-top box (STB), a television, and/or a user device or a user of a STB, a television, and/or a user device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
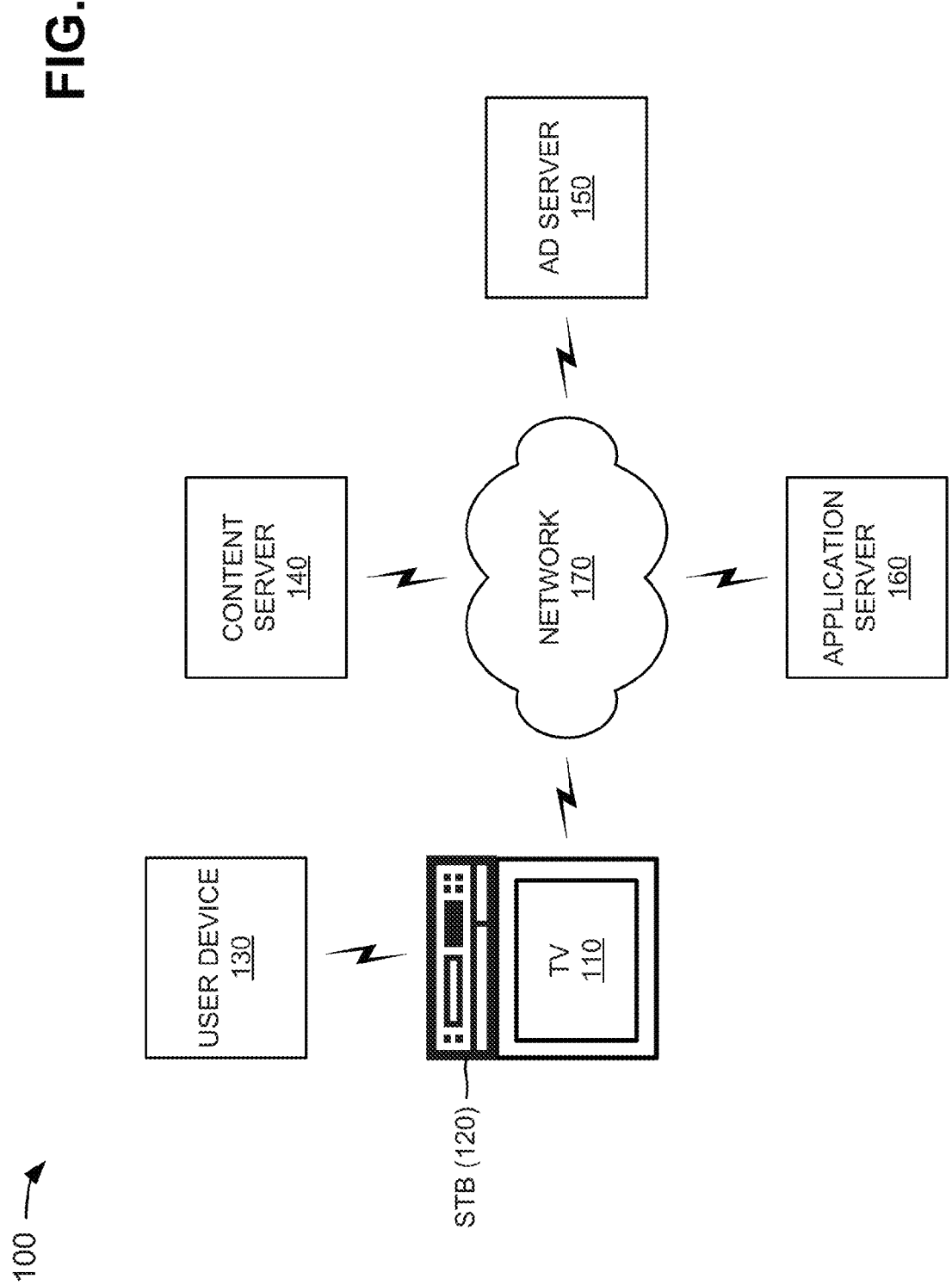
FIG. 1 is a diagram of an example network in which systems and/or methods described herein may be implemented.

FIG. 1 is a diagram of an example network 100 in which systems and/or methods described herein may be implemented. As illustrated, network 100 may include a television (TV) 110, a set-top box (STB) 120, a user device 130, a content server 140, an advertisement (ad) server 150, an application server 160, and a network 170. Devices and/or networks of network 100 may interconnect via wired and/or wireless connections. A single television 110, STB 120, user device 130, content server 140, ad server 150, application server 160, and network 170 have been illustrated in FIG. 1 for simplicity. In practice, there may be more televisions 110, STBs 120, user devices 130, content servers 140, ad servers 150, application servers 160, and/or networks 170.

Television 110 may include a television monitor that is capable of displaying television programming, content provided by STB 120, and/or content provided by other devices (e.g., a digital video disk (DVD) player, a video camera, etc., not shown) connected to television 110.

STB 120 may include a device that receives television content (e.g., from content server 140), and provides the television content to television 110 and/or another device. STB 120 may include a device that receives advertisements (e.g., from ad server 150), and provides the advertisements to television 110 and/or another device. STB 120 may allow a user to alter the television content provided to television 110 based on a signal (e.g., a channel up or channel down signal) from a remote control (not shown). STB 120 may record video in a digital format to a disk drive or other memory medium within STB 120. In one example implementation, STB 120 may be incorporated directly within television 110 and/or may include a digital video recorder (DVR). Alternatively, or additionally, television 110 and STB 120 may be replaced with a computing device, such as a personal computer, a laptop computer, a tablet computer, etc.

User device 130 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a smart phone; a laptop computer; a tablet computer; or other types of computation and/or communication devices. In one example, user device 130 may include a device that is capable of communicating with content server 140, ad server 150, and/or application server 160 via network 170.

Content server 140 may include one or more server devices, or other types of computation or communication devices, that gather, process, search, and/or provide information in a manner described herein. In one example implementation, content server 140 may include a computer system, an application, a cable head-end, and/or a broadcasting device capable of providing television content (e.g., VOD content, high definition (HD)-VOD content, TV programming, movies, on-demand services, live television, etc.), instructions, and/or other information to STB 120 and/or user device 130.

Ad server 150 may include one or more server devices, or other types of computation or communication devices, that gather, process, search, and/or provide information in a manner described herein. In one example implementation, ad server 150 may include a computer system, an application, a cable head-end, and/or a broadcasting device capable of providing advertisements, promotional information, commercials, coupons, instructions, and/or other information to STB 120 and/or user device 130.

Application server 160 may include one or more server devices, or other types of computation or communication devices, that gather, process, search, and/or provide information in a manner described herein. In one example implementation, application server 160 may receive, from user device 170, recorded audio and input information associated with content viewed by a user on television 110. Application server 160 may convert the recorded audio into textual information and may determine whether the content is an advertisement or television content based on the textual information and/or the input information. If the content is an advertisement, application server 160 may provide, to user device 130, promotional content related to the advertisement. If the content is television content, application server 160 may provide, to user device 130, promotional content related to the television content.

Network 170 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
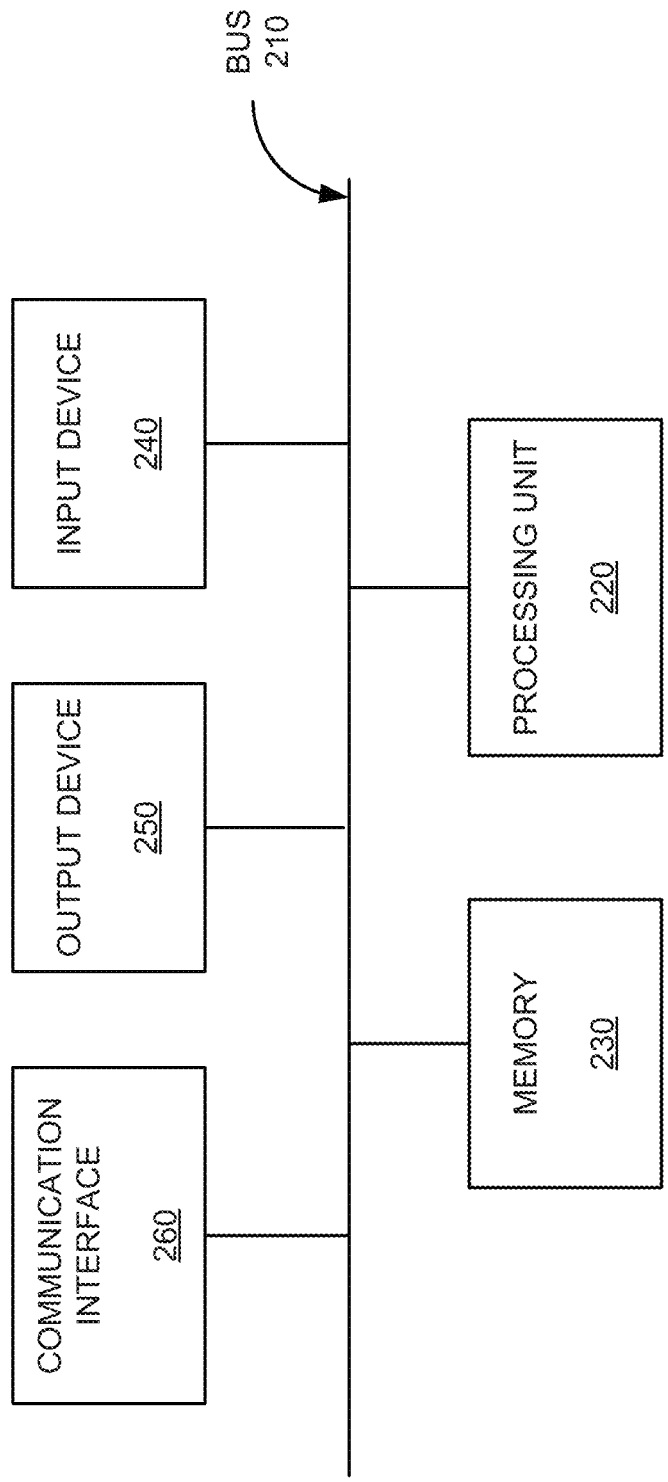
FIG. 2 is a diagram of example components of a device that may correspond to one of the devices of the network depicted in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
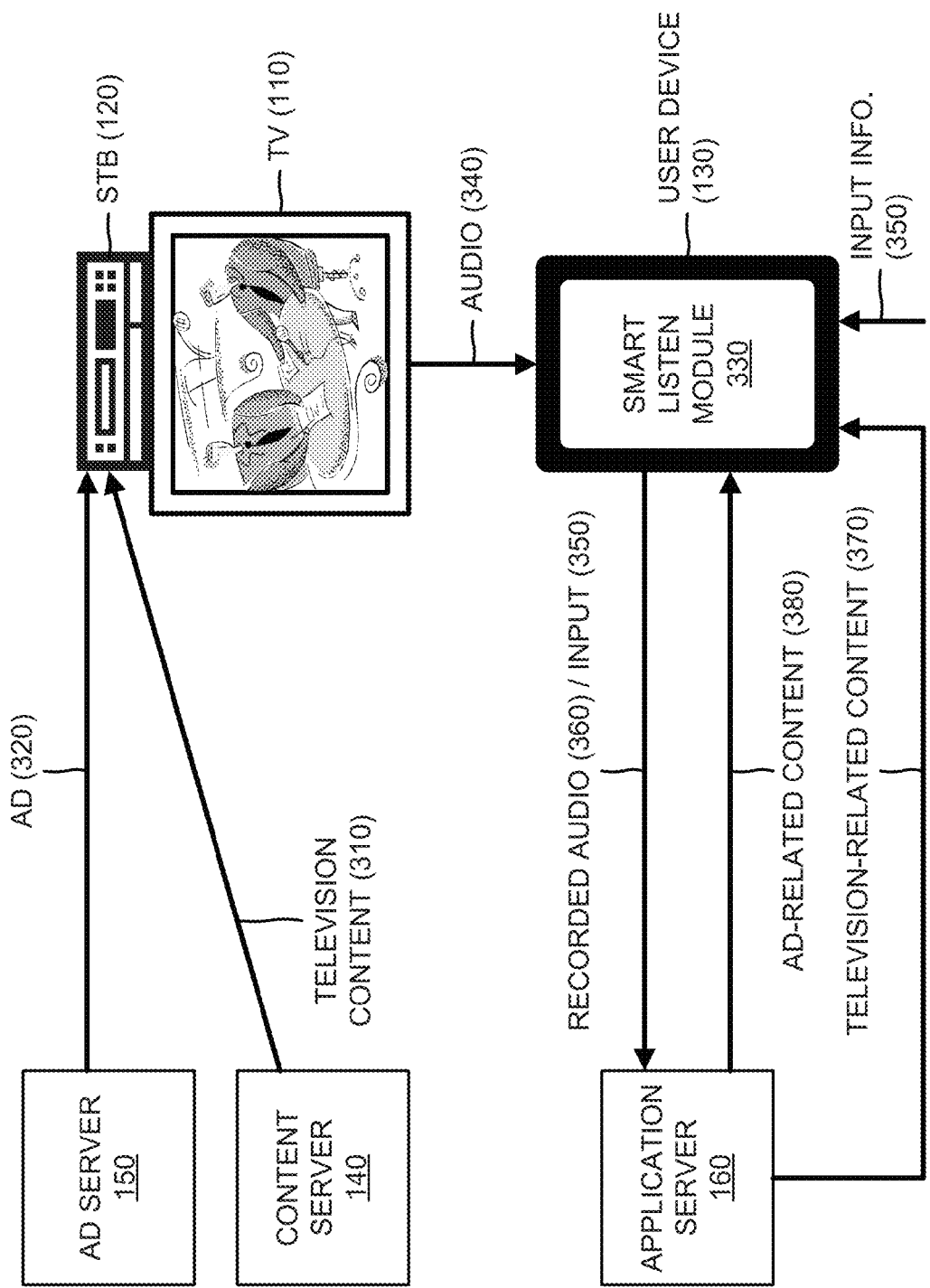
FIG. 3 is a diagram of example operations capable of being performed by an example portion of the network in FIG. 1.

FIG. 3 is a diagram of example operations capable of being performed by an example portion 300 of network 100 (FIG. 1). As shown, network portion 300 may include television 110, STB 120, user device 130, content server 140, ad server 150, and application server 160. Television 110, STB 120, user device 130, content server 140, ad server 150, and/or application server 160 may include the features described above in connection with, for example, one or more of FIGS. 1 and 2.

As further shown in FIG. 3, a user (not shown) may select content for displaying on television 110. For example, the user may utilize a remote control and/or user device 130 to instruct STB 120 to display the content on television 110. STB 120 may receive the content from content server 140 and/or ad server 150. Content server 140 may provide television content 310 to STB 120, and ad server 150 may provide an advertisement (ad) 320 to STB 120. Television 110 may receive television content 310 and/or advertisement 320 from STB 120, and may provide television content 310 and/or advertisement 320 (e.g., audio and video) to the user. Television content 310 may include a television show, a movie, PPV content, VOD content, a sporting event, etc. Advertisement 320 may include a commercial, an infomercial, a public service announcement, a movie trailer, a television show trailer, etc.

As further shown in FIG. 3, user device 130 may provide a smart listen module 330 to the user. Smart listen module 330 may enable user device 130 to receive and record audio 330 generated by television 110 during provision of content, such as television content 310 and/or advertisement 320. Smart listen module 330 may enable user device 130 to receive input information 350 associated with content currently provided by television 110, such as television content 310 and/or advertisement 320. Input information 350 may include keywords, a television channel, time and date information, user inputs to user device 130, etc. associated with content currently provided by television 110 to the user. User device 130, via smart listen module 330, may provide input information 350 and/or recorded audio 360 to application server 160. In one example, recorded audio 360 may be in a Moving Picture Experts Group (MPEG) audio layer 3 (MP3), a MPEG audio layer 4 (MP4), a Waveform Audio File (WAV), a Windows Media Video (WMV), etc. file format.

Application server 160 may receive, from user device 130, input information 350 and/or recorded audio 360, and may convert recorded audio 360 into textual information. In one example, application server 160 may utilize audio to text transcription software to convert recorded audio 360 into textual information. Application server 160 may determine whether the content currently provided by television 110 is television content 310 or advertisement 320 based on the textual information and/or input information 350. In one example implementation, application server 160 may compare the textual information and/or input information 350 to a database (e.g., provided in or associated with application server 160) of television content identifiers and advertisement identifiers. Application server 160 may determine the content currently provided by television 110 to be television content 310 when the textual information and/or input information 350 matches an identifier of television content 310 in the database (e.g., to a particular degree of certainty, such as more than fifty percent). Application server 160 may determine the content currently provided by television 110 to be advertisement 320 when the textual information and/or input information 350 matches an identifier of advertisement 320 in the database (e.g., to a particular degree of certainty, such as more than fifty percent).

In one example implementation, user device 130 may convert recorded audio 360 into textual information, and may provide textual information to application server 160 rather than recorded audio 360. In such an arrangement, application server 160 need not perform the conversion of recorded audio 360. Alternatively, or additionally, application server 160 may not convert recorded audio 360 into textual information, but may perform the comparison (e.g., with the database identifiers) using recorded audio 360 directly.

If application server 160 determines that the content currently provided by television 110 is television content 310, application server 160 may provide television-related content 370 to user device 130. User device 130 may receive television-related content 370, and may provide (e.g., for display) television-related content 370 to the user. In one example, television-related content 370 may include promotional video, images, social media (e.g., Facebook, Twitter, etc.), Internet or web information, advertisements, merchandise, etc. associated with television content 310. If application server 160 determines that the content currently provided by television 110 is advertisement 320, application server 160 may provide ad-related content 380 to user device 130. User device 130 may receive ad-related content 380, and may provide (e.g., for display) ad-related content 380 to the user. In one example, ad-related content 380 may include promotional video, images, social media (e.g., Facebook, Twitter, etc.), Internet or web information, further advertisements, coupons, etc. associated with advertisement 320.

Although FIG. 3 shows example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

Figure 4:
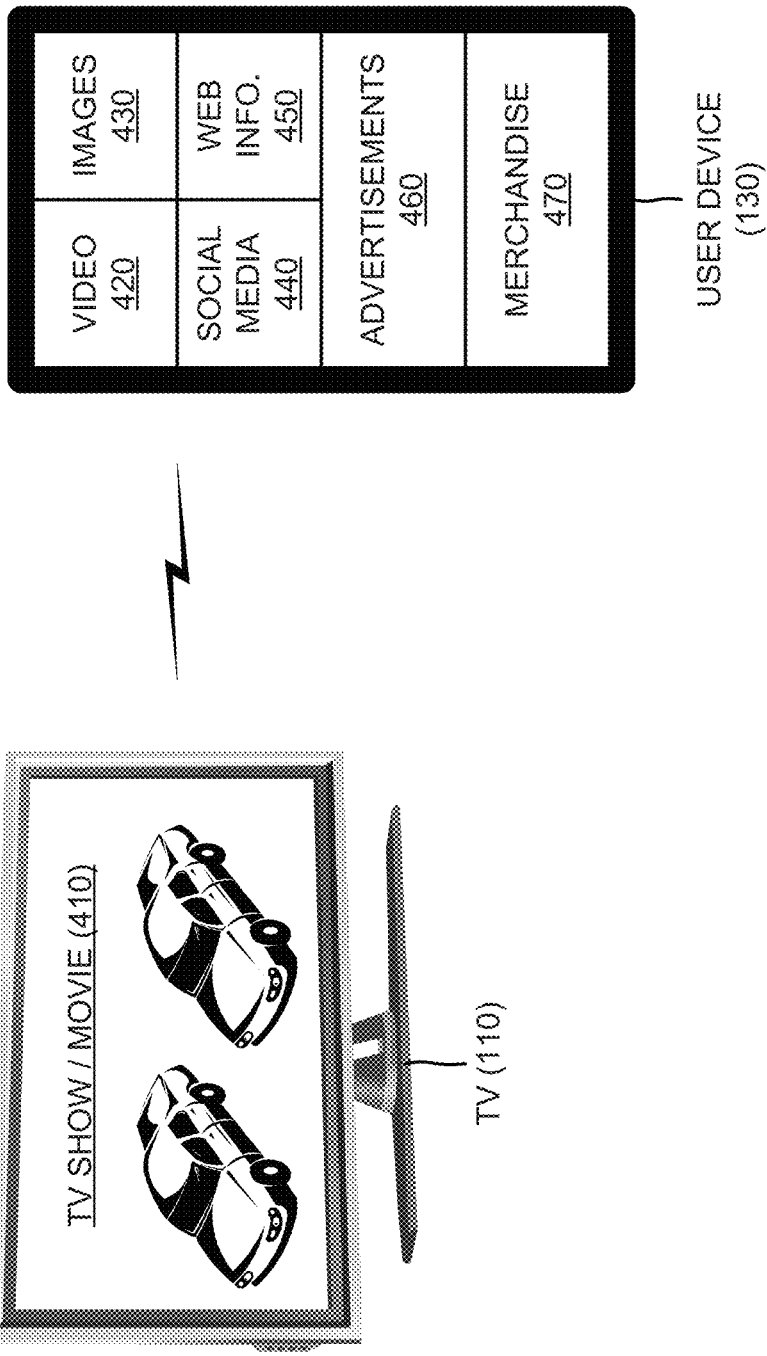
FIG. 4 is a diagram of example user interfaces capable of being generated or provided by a television and/or a user device of FIG. 1.

FIG. 4 is a diagram 400 of example user interfaces capable of being generated or provided by television 110 and/or user device 130. The user interfaces depicted in FIG. 4 as well as the user interfaces depicted in FIGS. 5 and 6 (hereinafter referred to collectively as "the user interfaces") may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices (e.g., input device 240, FIG. 2), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of television 110 and/or user device 130 (e.g., via a touch screen display, a mouse, a keyboard, a remote control, etc.).

As shown in FIG. 4, television 110 may provide a television show or movie 410 to a user (not shown). In one example, television show/movie 410 may include an episode of a television series, a made-for-television movie, an on-demand movie, an episode of a mini-series, a game show, etc. User device 130 may record audio and may receive input information (e.g., from the user) associated with television show/movie 410, and may provide the recorded audio and/or the input information to application server 160 (not shown). Based on the recorded audio and/or the input information, application server 160 may provide, to user device 130, content related to television show/movie 410. User device 130 may receive and provide the content related to television show/movie 410 to the user.

As further shown in FIG. 4, the content related to television show/movie 410 may include video 420, images 430, social media 440, web information 450, advertisements 460, merchandise 470, etc. associated with television show/movie 410. Video 420 may include digital content for past episodes of television show/movie 410, interviews with cast members of television show/movie 410, trailers for shows/movies related to television show/movie 410, music related to television show/movie 410, etc. Images 430 may include images of cast members of television show/movie 410, images of scenes from television show/movie 410, images for past episodes of television show/movie 410, etc.

Social media 440 may include Facebook, Twitter, Linkedin, Myspace, and/or other social media web pages associated with television show/movie 410 and/or associated with viewers of television show/movie 410. Web information 450 may include search results related to television show/movie 410, recommendations for other content related to television show/movie 410, poll questions for viewers of television show/movie 410, ability to vote for contestants of television show/movie 410 (e.g., when television show/movie 410 is a game show), a home page associated with television show/movie 410, etc. Advertisements 460 may include coupons associated with television show/movie 410 (e.g., coupons for movie tickets), advertisements (e.g., promotional banner ads, video ads, etc.) associated with television show/movie 410, etc. Merchandise 470 may include merchandise, such as, for example, T-shirts, toys, mugs, music, DVDs, memorabilia, magazine subscriptions, etc., available for television show/movie 410.

Figure 5:
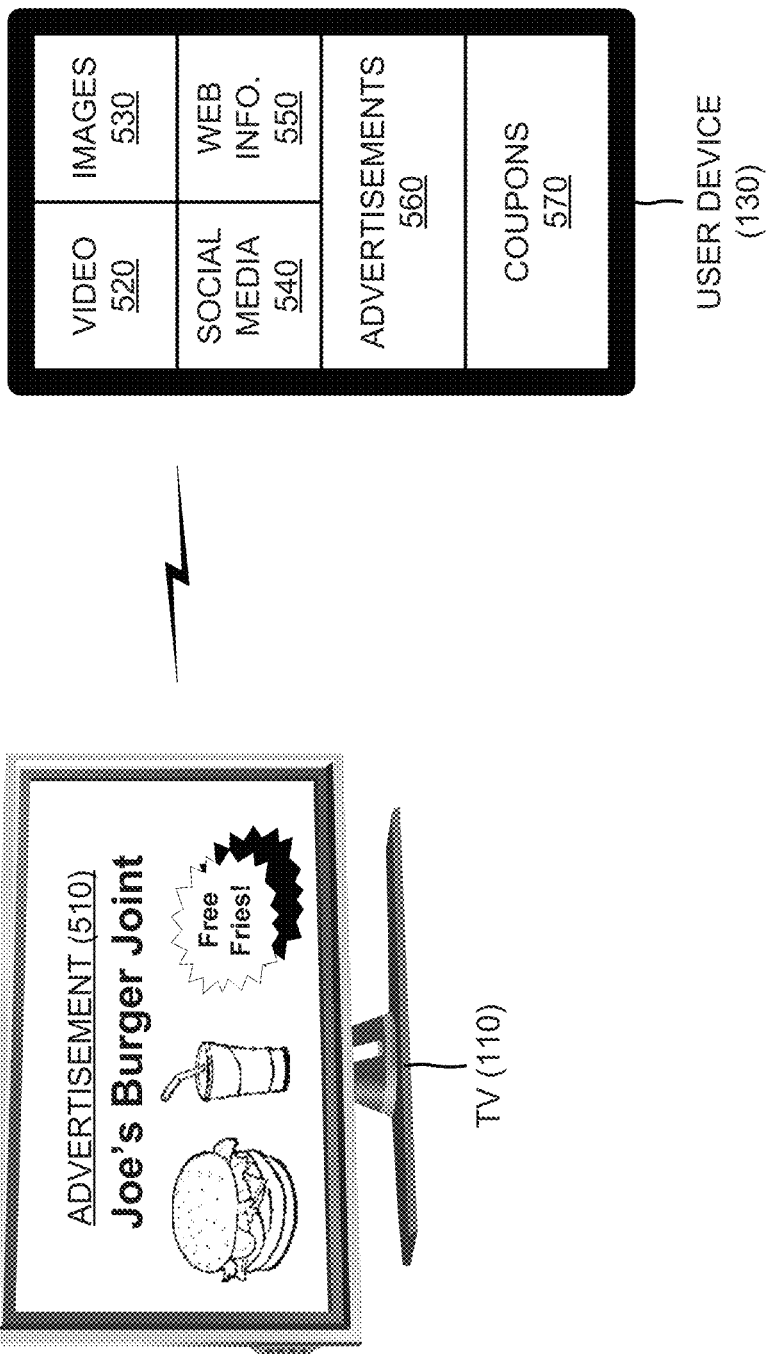
FIG. 5 is a diagram of additional example user interfaces capable of being generated or provided by the television and/or the user device of FIG. 1.

As shown in FIG. 5, television 110 may provide an advertisement 510 to a user (not shown). In one example, advertisement 510 may include a television commercial (e.g., for a fast-food restaurant), an infomercial, etc. related to a variety of products and/or services. A product may include anything that may be marketed or sold as a commodity or a good, such as a DVD, a smart phone, a computer, etc. A service may include any act or variety of work done for others (e.g., for compensation), such as telephone services, Internet services, network services, radio services, television services, video services, etc. User device 130 may record audio and may receive input information (e.g., from the user) associated with advertisement 510, and may provide the recorded audio and/or the input information to application server 160 (not shown). Based on the recorded audio and/or the input information, application server 160 may provide, to user device 130, content related to advertisement 510. User device 130 may receive and provide the content related to advertisement 510 to the user.

As further shown in FIG. 5, the content related to advertisement 510 may include video 520, images 530, social media 540, web information 550, advertisements 560, coupons 570, etc. associated with advertisement 510. Video 520 may include alternative advertisements associated with advertisements 510, video depicting a store associated with advertisement 510, video depicting merchandise available from the entity associated with advertisement 510, etc. Images 530 may include images of merchandise available from the entity associated with advertisement 510, images of a store associated with advertisement 510, etc.

Social media 540 may include Facebook, Twitter, Linkedin, Myspace, and/or other social media web pages of the entity associated with advertisement 510. Web information 550 may include search results related to advertisement 510, recommendations for other content related to advertisement 510, discounts available at local establishments associated with advertisement 510, a home page of the entity associated with advertisement 510, etc. Advertisements 560 may include promotional banner ads, video ads, etc. associated with advertisement 510, etc. Coupons 570 may include coupons associated with advertisement 510 (e.g., coupons for free French fries), coupons for merchandise, such as, for example, T-shirts, toys, mugs, music, DVDs, memorabilia, magazine subscriptions, etc., available from an entity associated with advertisement 510, etc.

Figure 6:
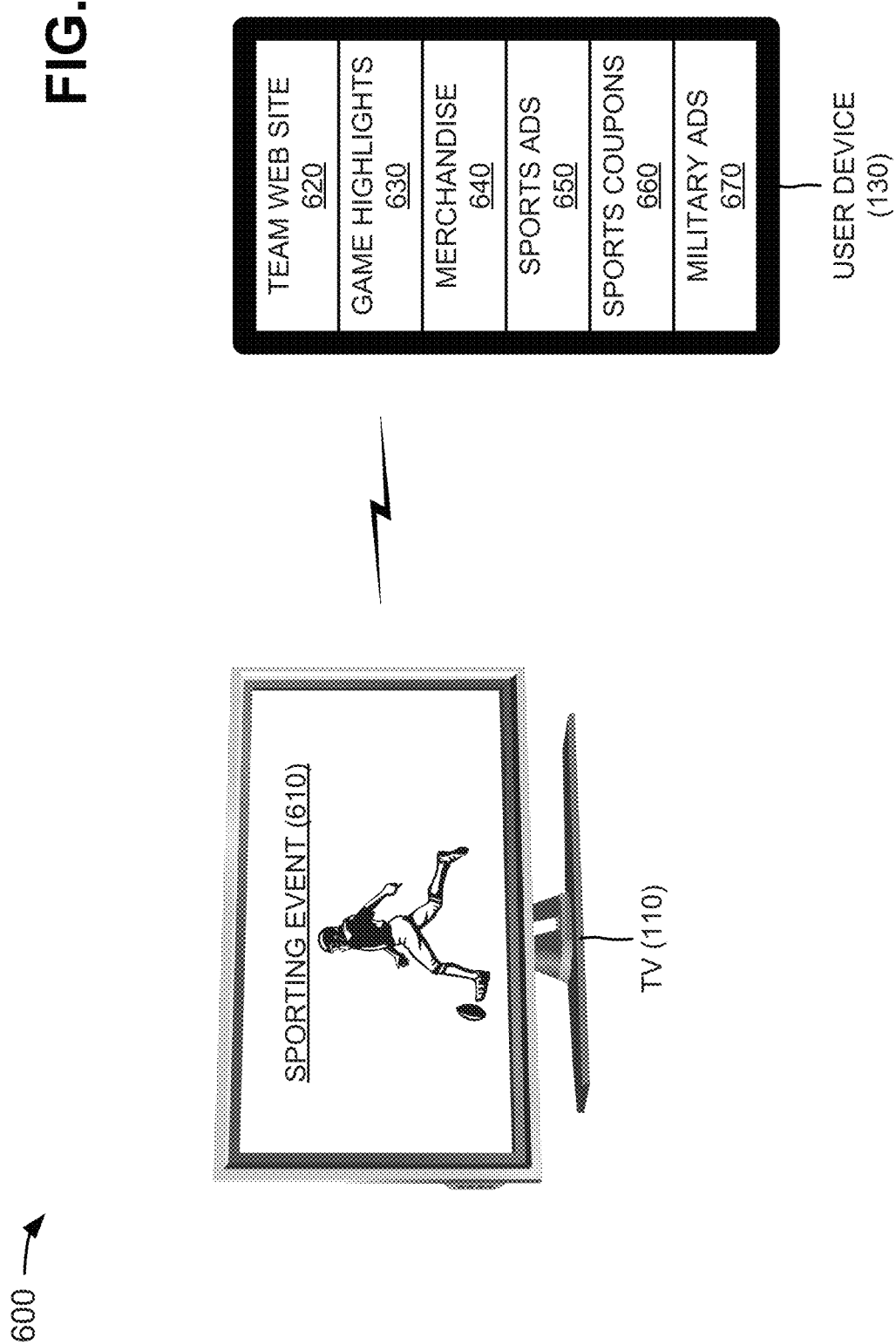
FIG. 6 is a diagram of further example user interfaces capable of being generated or provided by the television and/or the user device of FIG. 1.

As shown in FIG. 6, television 110 may provide a sporting event 610 to a user (not shown). In one example, sporting event 610 may include a football game, a baseball game, a soccer match, a tennis match, a basketball game, a hockey game, etc. User device 130 may record audio and may receive input information (e.g., from the user) associated with sporting event 610, and may provide the recorded audio and/or the input information to application server 160 (not shown). Based on the recorded audio and/or the input information, application server 160 may provide, to user device 130, content related to sporting event 610. User device 130 may receive and provide the content related to sporting event 610 to the user.

As further shown in FIG. 6, the content related to sporting event 610 may include a team web site 620, game highlights 630, merchandise 640, sports ads 650, sports coupons 660, military ads 670, etc. associated with sporting event 610. Team web site 620 may include web sites associated with one or more teams and/or players participating in sporting event 610. For example, team web site 620 may provide a home page for a professional football team. Game highlights 630 may include highlights associated with sporting event 610 and/or highlights from prior sporting events related to one or more teams in sporting event 610. Merchandise 640 may include merchandise, such as, for example, T-shirts, toys, mugs, music, DVDs, memorabilia, magazine subscriptions, etc., related to one or more teams and/or players in sporting event 610.

Sports ads 650 may include advertisements for sporting event 610, advertisements for one or more teams and/or players in sporting event 610, advertisements for local sports stores, advertisements for local sports brands, etc. Sports coupons 660 may include coupons for sports related lessons, coupons for gym memberships, etc. Military ads 670 may include advertisements for military recruitment, such as army, navy, air force, and/or marine recruitment.

Although the user interfaces of FIGS. 4-6 depict a variety of information, in other implementations, the user interfaces may depict less information, different information, differently arranged information, or additional information than depicted in FIGS. 4-6.

Figure 7:
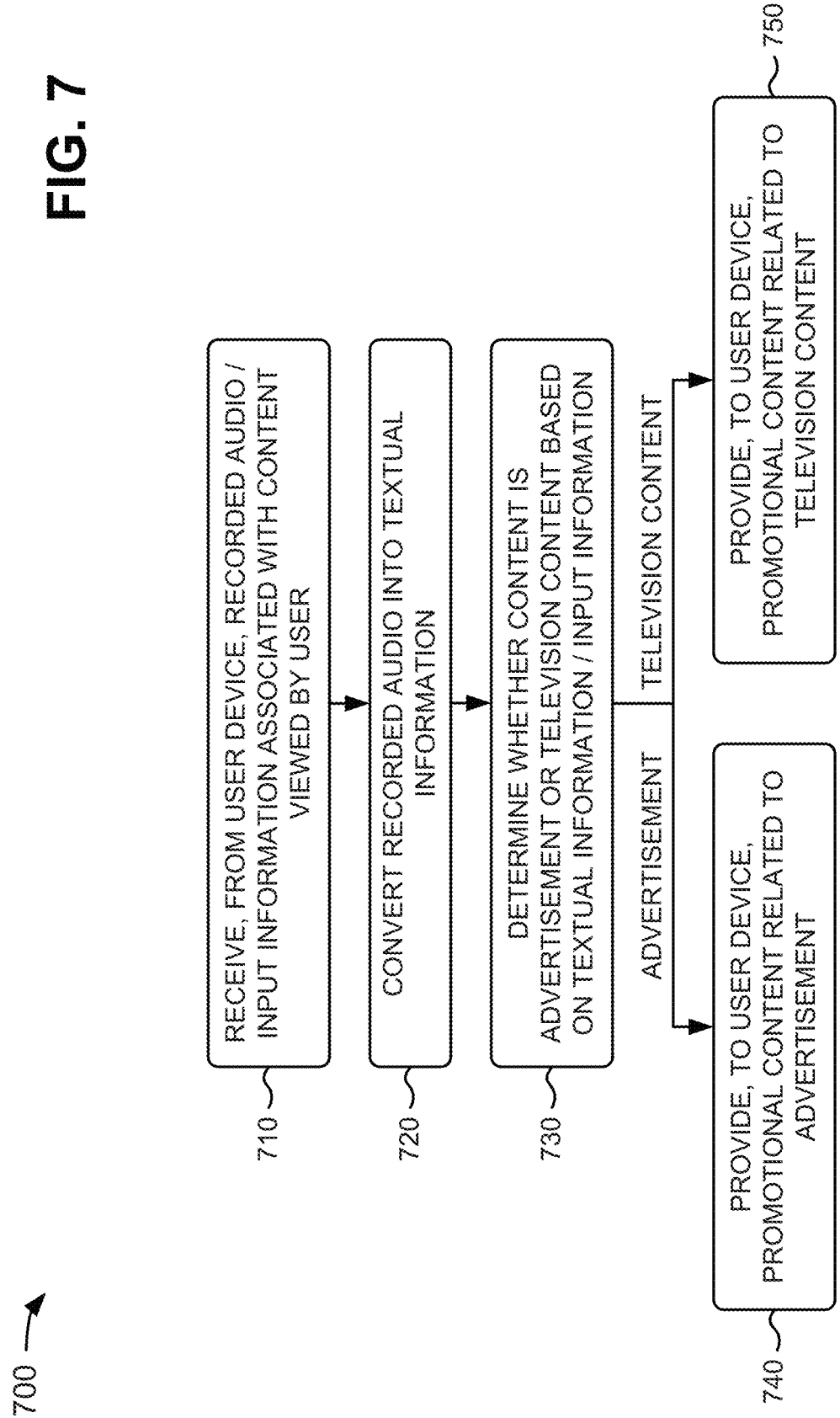
FIGS. 7 and 8 are flow charts of an example process for providing contextual information between a television and a user device according to an implementation described herein.
Figure 8:
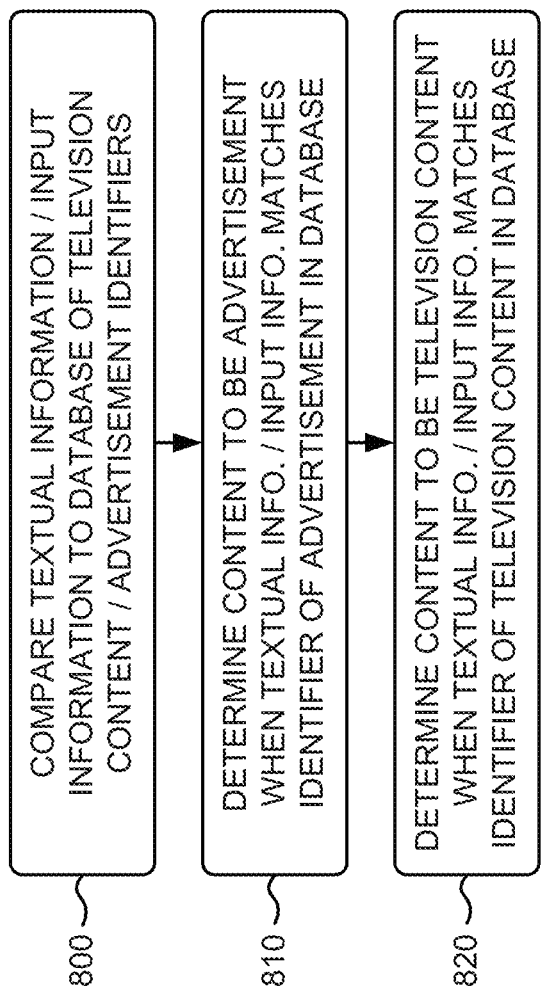

FIGS. 7 and 8 are flow charts of an example process 700 for providing contextual information between a television and a user device according to an implementation described herein. In one implementation, process 700 may be performed by application server 160. Alternatively, or additionally, some or all of process 700 may be performed by another device or group of devices, including or excluding application server 160.

As shown in FIG. 7, process 700 may include receiving, from a user device, recorded audio and/or input information associated with content viewed by a user (block 710), and converting the recorded audio into textual information (block 720). For example, in an implementation described above in connection with FIG. 3, smart listen module 330 may enable user device 130 to receive input information 350 associated with content currently provided by television 110, such as television content 310 and/or advertisement 320. Input information 350 may include keywords, a television channel, time and date information, etc. associated with content currently provided by television 110 to the user. User device 130, via smart listen module 330, may provide input information 350 and/or recorded audio 360 to application server 160. In one example, recorded audio 360 may be in a MP3, MP4, a WAV, a WMV, etc. file format. Application server 160 may receive, from user device 130, input information 350 and/or recorded audio 360, and may convert recorded audio 360 into textual information. In one example, application server 160 may utilize audio to text transcription software to convert recorded audio 360 into textual information.

As further shown in FIG. 7, process 700 may include determining whether the content is an advertisement or television content based on the textual information and/or the input information (block 730). For example, in an implementation described above in connection with FIG. 3, application server 160 may determine whether the content currently provided by television 110 is television content 310 or advertisement 320 based on the textual information and/or input information 350.

Returning to FIG. 7, if the content is an advertisement (block 730—ADVERTISEMENT), process 700 may include providing, to the user device, promotional content related to the advertisement (block 740). For example, in an implementation described above in connection with FIG. 3, if application server 160 determines that the content currently provided by television 110 is advertisement 320, application server 160 may provide ad-related content 380 to user device 130. User device 130 may receive ad-related content 380, and may provide (e.g., for display) ad-related content 380 to the user. In one example, ad-related content 380 may include promotional video, images, social media (e.g., Facebook, Twitter, etc.), Internet or web information, further advertisements, coupons, etc. associated with advertisement 320.

As further shown in FIG. 7, if the content is television content (block 730—TELEVISION CONTENT), process 700 may include providing, to the user device, promotional content related to the television content (block 750). For example, in an implementation described above in connection with FIG. 3, if application server 160 determines that the content currently provided by television 110 is television content 310, application server 160 may provide television-related content 370 to user device 130. User device 130 may receive television-related content 370, and may provide (e.g., for display) television-related content 370 to the user. In one example, television-related content 370 may include promotional video, images, social media (e.g., Facebook, Twitter, etc.), Internet or web information, advertisements, merchandise, etc. associated with television content 310.

Process block 730 may include the process blocks depicted in FIG. 8. As shown in FIG. 8, process block 730 may include comparing the textual information and/or the input information to a database of television content and advertisement identifiers (block 800), determining the content to be an advertisement when the textual information and/or the input information matches an identifier of the advertisement in the database (block 810), and determining the content to be television content when the textual information and/or the input information matches an identifier of the television content in the database (block 820). For example, in an implementation described above in connection with FIG. 3, application server 160 may compare the textual information and/or input information 350 to a database of television content identifiers and advertisement identifiers. Application server 160 may determine the content currently provided by television 110 to be television content 310 when the textual information and/or input information 350 matches an identifier of television content 310 in the database (e.g., to a particular degree of certainty, such as more than fifty percent). Application server 160 may determine the content currently provided by television 110 to be advertisement 320 when the textual information and/or input information 350 matches an identifier of advertisement 320 in the database (e.g., to a particular degree of certainty, such as more than fifty percent).

FIG. 9 is a flow chart of another example process 900 for providing contextual information between a television and a user device according to an implementation described herein. In one implementation, process 900 may be performed by user device 130. Alternatively, or additionally, some or all of process 900 may be performed by another device or group of devices, including or excluding user device 130.

As shown in FIG. 9, process 900 may include receiving audio and/or input information associated with content viewed by a user (block 910), recording the audio (block 920), and providing the recorded audio and/or the input information to an application server (block 930). For example, in an implementation described above in connection with FIG. 3, smart listen module 330 may enable user device 130 to receive and record audio 330 generated by television 110 during provision of content, such as television content 310 and/or advertisement 320. Smart listen module 330 may enable user device 130 to receive input information 350 associated with content currently provided by television 110, such as television content 310 and/or advertisement 320. Input information 350 may include keywords, a television channel, time and date information, etc. associated with content currently provided by television 110 to the user. User device 130, via smart listen module 330, may provide input information 350 and/or recorded audio 360 to application server 160. In one example, recorded audio 360 may be in a MP3, a MP4, a WAV, a WMV, etc. file format.

As further shown in FIG. 9, process 900 may include receiving, from the application server, promotional content related to an advertisement when the recorded audio and/or the input information indicate that the content viewed by the user is an advertisement (block 940), and providing, to the user, the promotional content related to the advertisement (block 950). For example, in an implementation described above in connection with FIG. 3, application server 160 may determine whether the content currently provided by television 110 is television content 310 or advertisement 320 based on the textual information and/or input information 350. If application server 160 determines that the content currently provided by television 110 is advertisement 320, application server 160 may provide ad-related content 380 to user device 130. User device 130 may receive ad-related content 380, and may provide (e.g., for display) ad-related content 380 to the user. In one example, ad-related content 380 may include promotional video, images, social media (e.g., Facebook, Twitter, etc.), Internet or web information, further advertisements, coupons, etc. associated with advertisement 320.

Returning to FIG. 9, process 900 may include receiving, from the application server, promotional content related to television content when the recorded audio and/or the input information indicate that the content viewed by the user is television content (block 960), and providing, to the user, the promotional content related to the television content (block 970). For example, in an implementation described above in connection with FIG. 3, application server 160 may determine whether the content currently provided by television 110 is television content 310 or advertisement 320 based on the textual information and/or input information 350. If application server 160 determines that the content currently provided by television 110 is television content 310, application server 160 may provide television-related content 370 to user device 130. User device 130 may receive television-related content 370, and may provide (e.g., for display) television-related content 370 to the user. In one example, television-related content 370 may include promotional video, images, social media (e.g., Facebook, Twitter, etc.), Internet or web information, advertisements, merchandise, etc. associated with television content 310.

Systems and/or methods described herein may enable a user device to obtain contextual information (e.g., advertisements, coupons, web sites, etc.) related to television content and/or advertisements currently being viewed by a user of the user device. In one example, the user may be watching a television show while holding a mobile user device (e.g., a smart phone, a tablet computer, etc.). The user may use the mobile user device to browse information related to the television show, such as a web page dedicated to the television show. The mobile user device may record audio associated with the television show, and may utilize the recorded audio and/or user inputs (e.g., keywords associated with television show) to identify the television show and automatically receive contextual information related to the television show. The contextual information may be displayed by the mobile user device and may include promotional advertisements, digital content, physical media, coupons, polls, quizzes, etc. associated with the television show.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 7-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device and from a user device, recorded audio content associated with content provided by the user device,
       the recorded audio content being based on audio content received by the user device from a television,
           the television receiving the audio content from a set-top box,
               the user device being different than the television and being different than the set-top box;
   converting, by the device, the recorded audio content into textual information;
   comparing, by the device, the textual information to reference information,
       the reference information including television content identifiers and advertisement identifiers;
   determining, by the device and based on the comparing, whether the content is an advertisement or television content; and
   selectively providing, by the device and to the user device, promotional content,
       selectively providing the promotional content including:
           providing, by the device and based on determining that the content is the advertisement first promotional content related to the advertisement; or
           providing, by the device and based on determining that the content is the television content, second promotional content related to the television content when the content.

2. The method of claim 1, further comprising:
   receiving input information associated with the content provided by the user device,
   where, when determining whether the content is the advertisement or the television content, the method includes:
       determining whether the content is the advertisement or the television content based on the input information.

3. The method of claim 2, where, when determining whether the content is the advertisement or the television content, the method includes:
   determining that the content is the advertisement when at least one of the textual information or the input information matches at least one of the advertisement identifiers; or
   determining that the content is the television content when at least one of the textual information or the input information matches at least one of the television content identifiers.

4. The method of claim 1, where, when determining whether the content is the advertisement or the television content, the method includes:
   determining that the content is the advertisement when the textual information matches at least one of the advertisement identifiers; and
   determining that the content is the television content when the textual information matches at least one of the television content identifiers.

5. The method of claim 1, where the first promotional content comprises one or more of:
   video associated with the advertisement,
   images associated with the advertisement,
   social media associated with the advertisement,
   web information associated with the advertisement,
   promotions associated with the advertisement, or
   coupons associated with the advertisement.

6. The method of claim 1, where the second promotional content comprises one or more of:
   video associated with the television content,
   images associated with the television content,
   social media associated with the television content,
   web information associated with the television content,
   advertisements associated with the television content, or
   merchandise associated with the television content.

7. The method of claim 1, where
   the first promotional content comprises a plurality of different types of content,
   the second promotional content comprises a plurality of different types of content, and
   at least one of the first promotional content or the second promotional content is provided, for presentation, by the user device in a single screenshot.

8. A device comprising:
   a memory to store instructions; and
   a processor to execute the instructions to:
       receive, from a user device, audio content associated with content provided by the user device,
           the audio content being based on audio content received by the user device from a television,
               the television receiving the audio content from a set-top box,
                   the user device being different than the television and being different than the set-top box;
       convert the audio content into textual information;
       compare the textual information to reference information,
           the reference information including television content identifiers and advertisement identifiers;

determine, based on the comparing, whether the content is an advertisement or television content; and selectively provide, to the user device, promotional content the processor, when selectively providing the promotional content, being to:

provide, to the user device and based on determining that the content is the advertisement, first promotional content related to the advertisement; or provide, to the user device and based on determining that the content is the television content, second promotional content related to the television content.

9. The device of claim 8, where, when determining whether the content is the advertisement or the television content, the processor is further to:

determine that the content is the advertisement when at least one of the textual information or input information matches at least one of the advertisement identifiers; or determine that the content is the television content when at least one of the textual information or the input information matches at least one of the television content identifiers.

10. The device of claim 8, where the first promotional content comprises one or more of:

video associated with the advertisement,
images associated with the advertisement,
social media associated with the advertisement,
web information associated with the advertisement,
promotions associated with the advertisement, or
coupons associated with the advertisement.

11. The device of claim 8, where the second promotional content comprises one or more of:

video associated with the television content,
images associated with the television content,
social media associated with the television content,
web information associated with the television content,
advertisements associated with the television content, or
merchandise associated with the television content.

12. The device of claim 8, where the first promotional content comprises a plurality of different types of content, the second promotional content comprises a plurality of different types of content, and at least one of the first promotional content or the second promotional content is provided, for presentation, by the user device in a single screenshot.

13. A method comprising:

receiving, by a user device, audio content associated with content, received from a television, and input information associated with the content, the television receiving the audio content from a set-top box, the user device being different than the television and being different than the set-top box;

recording, by the user device, the audio content;

providing, by the user device and to another device, the recorded audio content and the input information, the recorded audio content being converted, by the other device, to textual information;

selectively receiving, by the user device and from the other device, promotional content selectively receiving the promotional content including:

receiving first promotional content related to an advertisement based on the other device determining, based on comparing the textual information and the input information to reference information, that the textual information and the input information are related to the advertisement, the reference information including television content identifiers and advertisement identifiers; or receiving second promotional content related to television content based on the other device determining, based on comparing the textual information and the input information to the reference information, that the textual information and the input information are related to the television content; and providing, by the user device, the first promotional content or the second promotional content.

14. The method of claim 13, where the first promotional content comprises one or more of:

video associated with the advertisement,
images associated with the advertisement,
social media associated with the advertisement,
web information associated with the advertisement,
promotions associated with the advertisement, or
coupons associated with the advertisement.

15. The method of claim 13, where the second promotional content comprises one or more of:

video associated with the television content,
images associated with the television content,
social media associated with the television content,
web information associated with the television content,
advertisements associated with the television content, or
merchandise associated with the television content.

16. The method of claim 13, where the user device comprises:

a cellular telephone,
a personal digital assistant (PDA),
a smart phone,
a laptop computer, or
a tablet computer.

17. The method of claim 13, where the first promotional content comprises a plurality of different types of content, the second promotional content comprises a plurality of different types of content, and when providing the first promotional content or the second promotional content, the method includes:

providing, for presentation, the first promotional content or the second promotional content in a single screenshot.

18. A user device comprising:

a memory to store instructions; and
a processor to execute the instructions to:

receive audio content associated with content, received from a television, and input information associated with the content, the television receiving the audio content from a set-top box, the user device being different than the television and being different than the set-top box;

record the audio content provide, to another device, the recorded audio content and the input information, the recorded audio content being converted, by the other device, to textual information;

selectively receive, from the other device, promotional content, the processor, when selectively receiving the promotional content, being to:

receive first promotional content related to an advertisement based on the other device determining, based on comparing the textual information and the input information to reference information, that the textual information and the input information are related to the advertisement,
the reference information including television content identifiers and advertisement identifiers; or receive second promotional content related to television content based on the other device determining, based on comparing the textual information and the input information to the reference information, that the textual information and the input information are related to the television content; and provide the first promotional content or the second promotional content.

19. The user device of claim 18, where the second promotional content comprises one or more of:
video associated with the television content,
images associated with the television content,
social media associated with the television content,
web information associated with the television content,
advertisements associated with the television content, or
merchandise associated with the television content.

20. The user device of claim 18, where the first promotional content comprises one or more of:
video associated with the advertisement,
images associated with the advertisement,
social media associated with the advertisement,
web information associated with the advertisement,
promotions associated with the advertisement, or
coupons associated with the advertisement.

21. The user device of claim 18, where the user device comprises:
a cellular telephone,
a personal digital assistant (PDA),
a smart phone, a laptop computer, or
a tablet computer.

22. The user device of claim 18, where
the first promotional content comprises a plurality of different types of content,
the second promotional content comprises a plurality of different types of content, and
the processor, when providing the first promotional content or the second promotional content, is further to:
provide, for presentation, the first promotional content or the second promotional content in a single screenshot.

* * * * *